Jan. 14, 1969  R. S. BABINGTON ET AL  3,421,692
METHOD OF ATOMIZING LIQUIDS IN A MONO-DISPERSED SPRAY
Filed Dec. 29, 1966

INVENTORS
ROBERT S. BABINGTON
WILLIAM R. SLIVKA
ALBERT A. YETMAN

BY Smith, Michael, Bradford
and Gardiner
ATTORNEYS

United States Patent Office 3,421,692
Patented Jan. 14, 1969

3,421,692
METHOD OF ATOMIZING LIQUIDS IN A MONO-DISPERSED SPRAY
Robert S. Babington, 1113 Ingleside Ave., McLean, Va. 22101; Albert A. Yetman, 12316 Kembridge Drive, Bowie, Md. 20715, and William R. Slivka, 17 Shellflower Road, Levittown, Pa. 19056
Filed Dec. 29, 1966, Ser. No. 605,777
U.S. Cl. 239—8                                   15 Claims
Int. Cl. B05b 17/00; B05b 7/32

ABSTRACT OF THE DISCLOSURE

This invention deals with a method of converting liquids into the form of a spray defined by mono-dispersed small, 50 micron or less, particles by introducing the liquid onto a smooth unconfining surface having an aperture therethrough, causing the liquid to film out on the surface either by surface tension or by the shape of the surface so that the liquid is under a stress before it reaches the aperture; the film flowing completely over the aperture and being stressed during and after such flow and additionally further stressing the film by discharging a gaseous dispersing medium through the aperture whereby as it passes across the stressed film, minuscule particles of the liquid break away from the film to form the spray.

---

Figure 1:
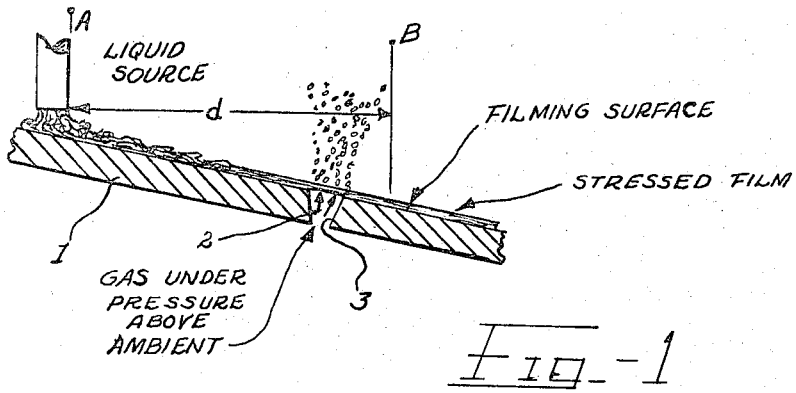
Figure 2:
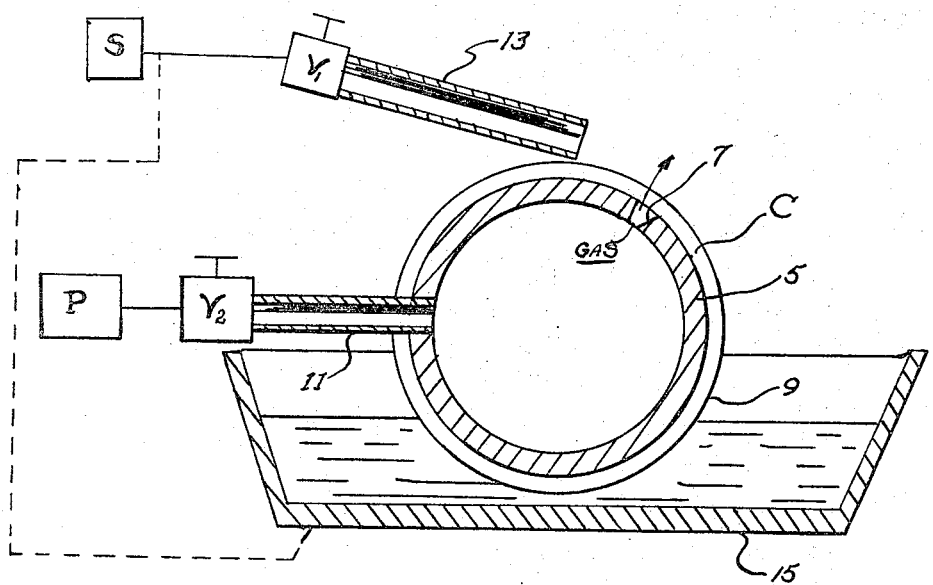

This invention is concerned with a method of diffusing liquids in a gaseous medium. More particularly, the invention is concerned with a method of atomizing liquids so as to efficiently produce a uniform dispersion thereof so fine in characteristic that the liquid is capable of almost instant absorption in the gaseous medium into which it is introduced. The method has application in a wide variety of environments such as air humidification, fuel atomization, metal coating, chemical or food processing and the like, where it is essential that the spray be comprised, as nearly as possible, of very small uniform liquid particles free of drops or droplets which are not uniform in size and which would cause incomplete dispersion of the liquid in the gaseous medium and, in the case of metal coating or the like, would cause uneven deposition of the dispersed liquid on the surface being treated or exposed to the spray.

A spray or diffusion of liquid in a gas which is possessed of characteristics most nearly desirable in applications to which this invention is directed is that of natural fog, water in air, and the method creates a spray or liquid dispersion which more nearly approaches the characteristics of natural fog than any method previously known.

The liquid particles in a natural fog are essentially spherical in shape and uniform in size. The attainment of these characteristics, along with the proper particle size, are extremely important in many spray applications. For example, in the spray drying of certain foods these characteristics determine to a great extent the size, texture, density, and taste of the dried product. When spraying such foods with a conventional pressure or two-fluid nozzle, the turbulence within the nozzle often tears the liquid food apart into a polydisperse spray of randomly-shaped particles. This destroys the colloidal properties and the taste of the dried product. In the method described herein, the ideal monodisperse spray of spherical particles is very closely approximated. In the case of spray-dried foods this prevents product denaturalization, and manifests itself in better product quality and taste.

The value of being able to produce a spray which approximates the characteristics of natural fog is inestimable not only in food processing, but particularly where it is desired to absorb a liquid in a gas. Since rate of absorption of a liquid into a gas is a function of the exposed surface area of the liquid to a given gas, the greater the surface area of exposed liquid, the greater is the rate of absorption of liquid into gas. For this reason, it is customary to spray the liquid to be absorbed by a gas directly into the gas stream, because, in so doing, the surface area of the liquid exposed to the gas in increased manyfold over that area which would be exposed, if the gas were simply passed over a pool or flowing bath of the liquid. For example, if a gallon of water/minute is atomized to a spray with a surface average drop size of 50 microns this would be equivalent to creating 4900 $ft.^2$ of new surface/minute. Since the exposed surface area in a spray is a function of particle size of the sprayed liquid, efforts to reduce the particle size, thus increasing the exposed surface area, have and continue to be made to produce smaller and smaller dispersed liquid particles of completely uniform distribution in the gaseous absorbent. The ideal spray is considered by many to be comprised of truly spherical monodispersed liquid particles of as small a micron size as can be attained.

Many prior art patents notably Diebold, U.S. 1,348,811, have sought but failed to obtain the results described in connection with the present method. Thus, throughout the description references will be made to the characteristics of natural fog as the optimum result sought to be and, in fact, very closely approximated by practice of the unique method.

Accordingly, it is an object of the invention to produce a method of dispersing liquids in a gaseous medium.

It is a further object of the invention to produce a liquid spray having characteristics closely approaching that of natural fog.

An additional object of the invention resides in a method of producing a fog-like dispersion of liquid characterized by the uniform minuscule pattern of the liquid particles so dispersed.

Still another object of the invention is to develop a highly efficient method of liquid dispersion having broad utility but particularly useful in the fields of air conditioning, spray drying, and fuel atomization, among others.

Other objects will be readily apparent to those skilled in the art, though not specifically set forth and these and the stated objects may be accomplished by a method of dispersing liquids comprising the steps of providing a smooth, liquid flow surface having at least one aperture in said surface, flowing the liquid to be dispersed over the surface with sufficient kinetic energy to pass uninterrupted over the aperture in a thin film, supplying gas to the aperture under a pressure above the ambient pressure of the gas acting on the upper surface of the film whereby the film is stressed to the point of rupture, the gas emerging from the apparatus carrying minuscule particles of liquid from the film in a uniform dispersion closely approaching the characteristics of natural fog.

In the method just described, tests have been conducted with a wide variety of liquids and liquid flow surfaces. It has been found that any liquid can be caused to film out if applied to a surface having adhesive properties relative to the liquid greater than the cohesive strength between the molecules of the liquid itself. Thus, water spreads on glass. The liquid will have a greater tendency to spread or film over the surface as the adhesion between the liquid and the solid increases relative to the self-cohesion of the liquid. Under these conditions the surface is said to be wettable, or hydrophilic as in the case when the liquid being used is water.

Another way of expressing this phenomenon of surface tension, is by means of the liquid/surface contact angle $\theta$. A solid is completely wet with a liquid when $\theta=0°$, as in the case of clean glass and pure water. The contact angle will increase as the adhesion between the liquid and the solid decreases. A contact angle of 180° would be indicative of zero adhesion, and while this is never reached in practice, mercury on steel gives a contact angle of 154° thus the surface is non-wettable as to mercury. The basic aspects of surface tension are fully discussed and reference is made to "Elementary Fluid Mechanics" by Vennard, 2nd ed.; published by John Wiley and Sons, Inc., New York, N.Y., April 1948. In general, it is easier to obtain finer fog particles when using liquids and surfaces which produced small contact angles obviously less than 154°. However, it has also been found that the desired liquid film thickness and subsequent spray quality for a given orifice discharge pressure can be obtained by using materials and liquids with non-wetting characteristics such as Teflon and water. When using materials and liquids that produce high contact angles, the desired film thickness, hence spray quality can be obtained by providing the liquid film passing over the apertured surface with enough kinetic energy or velocity to suppress the normal tendency for the liquid to recede away from the surface.

FIGURE 1 represents an effort to graphically illustrate the physical phenomena produced by the method hereof. For purposes of simplicity, the description will proceed on the basis of saturating air with water, i.e., increasing relative humidity, though it should be understood that the concepts herein are not so limited. In this regard, glass is also referred to when used in the descriptive matter; but, any of a wide variety of materials could be used, hence a specific material is not identified in FIGURE 1.

In FIGURE 1 then, there is provided a surface, which by way of optimum results could be glass and may be curved or flat, the latter being shown, the former being preferred. Surface 1 having a very small, about .010 inch, hole or aperture 2, therein. As shown, aperture 2 is provided with divergent, outwardly opening walls 3. The divergency of walls 3 is not mandatory to the performance of the method but is preferred because it has been found that the efficiency of the method is increased by using an aperture having such divergent walls as distinguished from a straight-walled or parallel-walled aperture. Also, while the shape of the aperture 2 in plan view is not shown, it is to be understood that the plan shape can be circular, oval or in a preferable form, in the shape of an elongated slit. Further, any number of apertures may be used depending on the amount of absorbed liquid to be dispersed in a given gaseous stream at any given flow rate.

A liquid to be dispersed, in this case water, is permitted to flow from a source onto surface 1, kinetic energy being imparted thereto to a degree sufficient to cause same to flow in a film over the surface 1. Due to the adhesive properties of the water to the glass, the film may be said to be under stress over this entire surface area. As the film advances, it follows the inclination of surface 1 beyond aperture 2. The force of gravity tends to accelerate the film flow with the result that further stress is induced in the film as it passes down the surface due to the difference in velocity between the point of liquid introduction on the surface, at point A, and the point where acceleration due to gravity has had its effect, for example at point B. If aperture 2, then is positioned, as shown, between these two points, i.e., within the distance *d*, it has been found that the film is induced to completely flow over the aperture though highly stressed to extreme thinness. The phenomenon may be likened to a thin membrane stretched over an apertured surface. The stress in the membrane simply draws it over a small aperture as if the latter were not present.

In the present method of liquid dispersion, a flow of a suitable gas is caused to be emitted through aperture

2 from a suitable source. Since air and water are the materials used for descriptive purposes, it is a relatively simple matter to induce the flow of the same gas, air, through the aperture from a pump P so that the air emerges from the aperture at a pressure slightly above ambient, that is, at a pressure slightly above the pressure of the gas against the top surface of the film. This flow stresses the film to the point of rupture with the result that minuscule particles of water will be dispersed upwardly into the ambient gas. This phenomenon can be observed. However, the precise reasons why it occurs has not been pinpointed. It is a fact, however, that the film appears continuous over the aperture though it may be surmised that once the film ruptures, the suction of the discharge gas pulls the edges of the film towards the core of the gas stream emerging from aperture 2. This results in a continual fog-like dispersion of liquid, as long as the liquid film flows over surface 1 and encounters the discharge gas. Opposing the pull or suction of the discharge gas, and tending to stress the film to extreme thinness, is the surface tension of the liquid itself and the inertia force of the liquid film passing over surface 1. This latter force is unique to the present method and it is created by virtue of the fact that more liquid is supplied to surface 1 than is actually dispersed by the discharge gas from aperture 2. The interaction of these forces serves to efficiently prepare the liquid for spraying by causing it to form into a highly-stressed thin film prior to the time it encounters the discharge gas.

The importance of supplying more liquid to the apertured surface than is actually dispersed by the discharge gas can be appreciated by considering the case where the liquid quantity supplied to surface 1 is equal to the liquid quantity dispersed by the discharge gas as for example in Diebold. Under these conditions, the liquid supply must be accurately metered to match the amount which is dispersed by the discharge gas. Consequently, the liquid supply does not possess sufficient kinetic energy, nor does it utilize enough flow surface area, to form into what could be considered a true thin film prior to the time it is dispersed. As a result the liquid feed enters the gas stream more in the form of a ribbon or narrow stream with a blunt or rounded leading edge. Furthermore, the gas stream encounters all of the liquid on the upstream side of the aperture and none of the liquid at other locations around the periphery of the aperture. The spray produced under these conditions is extremely polydisperse and coarse in nature. In addition, since the liquid feed enters the gas stream at only one location, the available gas flow energy is not effectively utilized and the system efficiency is penalized.

By flooding surface 1 with an excess of liquid (i.e., over and above that which is dispersed by the discharge gas from aperture 2) these disadvantages are overcome. Critical metering of the liquid supply is not required because the liquid film thickness can be controlled almost independent of the liquid supply quantity. The presence of the thin liquid film passing over the apertured surface insures that the film is symmetrically drawn upon by all portions of the discharge gas stream, with the result that a highly-efficient and fog-like spray is produced which is more monodispersed than sprays produced by any conventional means known to those most experienced in the field of liquid dispersion. In the resent method, the spray evolves from a small discontinuity in the otherwise continuous film, at a point directly over the discharge aperture 2.

As previously stated, surface 1 may be advantageously and preferably curved from the point of liquid application A to point B, and even beyond point B. This is because the downwardly curved surface causes the liquid to accelerate through distance D, thus stressing the liquid film to a greater extent than would occur on a flat surface. Reference to our copending application Ser. No. 605,779, filed of even date, will be helpful in ascertaining the structural form that the surface may take.

Thus by matching the velocity of the liquid film to the contour of the apertured surface, the film can be stressed almost to the point of rupture before it is dispersed by the discharge gas. As a result very little energy is required to disperse the liquid film, which in turn increases the efficiency of the method. It can be seen, then, that the more the liquid film velocity and the apertured surface contour are combined to contribute to the stressing and thinning out of the liquid film the smaller the dispersed particles will be, and the lower the dispersing energy requirements will be. It has been found that these two parameters can be easily matched to produce liquid films of extreme thinness and subsequent sprays of extreme fineness. In most cases, the desired velocity can be achieved by a gravity feed system such as shown in FIGURE 1, so that pressurization of the liquid feed is not required. Insofar as the contour of the apertured surface is concerned it has been previously stated that a curved surface with the film flowing on the convexed side will, in general, produce a thinner film than a flat surface. However, there are applications where the greatest film stress can be obtained with a flat surface. In general, however, the preferred surface configuration for a single aperture is one in which at least a portion of the surface is spherical, with the aperture located at or near the high point of the spherical portion of the surface. With this arrangement the liquid flows away from the aperture in all directions except at the point where it is supplied to the spherical portion of the surface. As a result the liquid forms into a highly-stressed thin film, and in so doing is very effectively prepared for dispersion by the discharge gas. A detailed description of several plenum chamber and surface contour designs is provided in the co-pending application of Robert S. Babington, William R. Slivka and Albert A. Yetman filed concurrently herewith. In every case the greatest efficiency of the present method (defined as the total surface area of the droplets produced, divided by the energy required to do the dispersing) is obtained when the discharge aperture is located at the point where the film passing over the apertured surface is the thinnest. In general this point is located in a region where the film is stabilized, and to the naked eye appears to be virtually undetectable as a moving liquid.

Experimental tests have shown that the present method will produce a uniform and finely divided fog of water with only 0.08 pound of air required for each pound of water atomized. In general the spray from a conventional two-fluid atomizer will break down at mass ratios (i.e., #air/#water) below 0.1. The high atomizing efficiency associated with the present method is obtained in part because the spray closely approximates a direct drop formation from the thin liquid film passing over the apertured surface, whereas in the conventional two fluid atomizing sequence the liquid is torn into ligaments before the liquid droplets are formed.

The discovery that such an efficient dispersion of fluid can be attained has resulted in the development of several forms of apparatus. In its simplest form, however, an apparatus for so doing is illustrated in FIG. 2 to satisfy the demands of the statute in respect of utility of the claimed method.

As shown, the film forming surface is comprised of a tubular chamber 5 of a suitable material, as related to the liquid, and having an aperture 7 located therein; the aperture being positioned slightly off of the vertical to the right. The ends of the tube are closed by suitable caps 9, only one shown, whereby the tube defines a closed plenum chamber.

In communication with the interior of the tube is a gas pump P via a regulator valve V2 and conduit 11 whereby gas at slightly above ambient pressure is introduced into the plenum.

Disposed immediately above the tube 5 and having its end terminating just about in a vertical plane passing axially through the center of the tube is a fluid discharge conduit 13 to which fluid is supplied via a regulator valve V1 from any suitable source S. A fluid receptacle 15 may be provided beneath the tube for practical purposes, to receive fluid flowing over the tube and not dispersed; the fluid, if desired, being recirculated, as indicated in dotted lines, back to pump P.

By way of example, apparatus similar to that shown in FIG. 2 was used as a basis for test procedures to determine the efficiency and uniformity of the spray produced by the present method. In these tests various numbers, shapes and sizes of apertures were used and various gas pressures introduced into the plenum. At all times, the liquid flow was regulated so that, to the naked eye, the flow of water over the tube from conduit 13 was such that no ripples, waves or other disturbance was apparent as it passed over the aperture. Stated another way, the flow was regulated so as to be so smooth as to be almost undetectable in the area from the end of conduit 13 to the point C where the fluid fall increases due to gravity. At the same time air flow through aperture 7 was also regulated to provide various pressures, while the efficiency of the test apparatus was measured in terms of total gallons of water per hour dispersed divided by the quantity of air required to do the dispersing. The liquid measurement was made by actual collection and condensation of the dispersed fog, while the amount of air utilized was calculated knowing the discharge air pressure and temperature, the ambient conditions, and the discharge flow area.

Although the best results can be obtained when the fluid film is smooth and thin, it should be pointed out that the present method is not overly sensitive to film thickness, fluid disturbances, or even pulsations in the gas discharge flow. When operating with the optimum film conditions the present method will produce a uniformly and finely divided spray at gas pressures as low as 2–3 p.s.i.g. If for some reason such as fluid viscosity and/or liquid trash content, it is necessary to operate with a thick, or non-uniform liquid film, these conditions can be compensated for by increasing the pressure of the discharge gas. For example, the spray produced at gas pressures of 10 p.s.i.g. or greater, is relatively insensitive to fluid disturbances and/or changes in fluid film thickness.

The following table shows typical test results obtained with several orifice sizes and shapes, at an orifice discharge pressure of 8 p.s.i.g. The data is tabulated so that each horizontal column represents a constant orifice airflow regardless of the orifice configuration. Presented in this manner the data readily show the performance gains obtained by changing the orifice configuration from a straight-through circular orifice, to a divergent circular orifice, to a straight-through slit-like orifice. From the tabulated data it can be postulated that a divergent slit-like orifice would produce even greater capacities than those recorded in the table, and hence would be more efficient.

| Orifice airflow in s.c.f.m. | Circular orifice dia. corresponding to orifice airflow | Orifice discharge pressure in p.s.i.g. | Spray discharge capacity in gallons/day | | |
|---|---|---|---|---|---|
| | | | Straight-through circular orifice | Divergent circular orifice | Straight-through slit-like orifice |
| .02 | .010 | 8 | 2.2 | 2.8 | 3.1 |
| .09 | .020 | 8 | 8.1 | 10.8 | 13.1 |
| .20 | .030 | 8 | 15.1 | 20.6 | 27.1 |
| .35 | .040 | 8 | 22.7 | 31.5 | 44.5 |
| .55 | .050 | 8 | 30.4 | 43.0 | 67.0 |
| .80 | .060 | 8 | 38.4 | 57.6 | 90.0 |

As stated earlier the materials water, and glass, used as examples, are merely exemplary of the method which may readily be used to disperse a variety of liquids in a variety of gaseous mediums, for example, in fuel atomization the fluid could be kerosene; the surface stainless steel; and the dispersing gas, air. In metal processing, i.e., rolling, the fluid could be oil; the surface, copper; the dispersing gas, hot air.

During all of the tests, careful observation was made of the uniformity and fineness of the spray. Since equipment was not available for measuring the size of the liquid droplets, visual inspection was carried out by providing a dark surface opposite the point of inspection, the spray being between the observation point and the dark background, and a high powered flood lamp was directed at the spray area. The liquid dispersion was found to resemble a fog-like cloud of completely uniform appearance and free of any large drops or droplets.

In fact, when a condensing surface, i.e., a flat piece of metal, was introduced into the dispersed liquid and then removed for inspection it was found that it was completely and uniformly covered with fluid, the appearance being strikingly similar to a car roof, for example, covered with a heavy dew. There was no evidence of any undispersed particles anywhere on the metal surface.

Having described the invention in detail, it will be apparent that modifications and changes therein may occur to those skilled in the art, same being within the spirit and scope of the concepts of the invention, which is limited only as defined in the claims.

What is claimed is:

1. A method of dispersing a liquid into a gaseous medium comprising the steps of providing a smooth unconfining surface having an aperture therethrough; directing a continuous flow of liquid over the surface and said aperture; inducing in the flowing liquid laterally directed internal stress prior to its passage over the aperture whereby the liquid is in prestressed thin film form having an unconfined surface area prior to and as it passes over said aperture and supplying gas under pressure through the aperture and the liquid film toward the unconfined surface area thereof to additionally stress the film by passage of the gas therethrough, the gas carrying from the liquid surface minuscule particles of the liquid in the form of a fine mist into the surrounding gaseous medium.

2. The method as defined in claim 1 wherein the step of inducing said internal stress in said liquid is effected by flowing the liquid over a convex surface.

3. The method as defined in claim 1 wherein the step of inducing said internal stress in said liquid is effected by introducing the liquid onto a surface with which it has a contact angle less than 154°.

4. The method of producing a mono-dispersed spray of spherical droplets for dispersing a liquid into a gaseous medium comprising the steps of providing a smooth, convex surface having at least one aperture therein; causing a continual flow of liquid onto the surface at a point upstream of the location of the aperture while imparting sufficient kinetic energy to the liquid to cause same to film over the surface and the aperture, said liquid film being internally stressed at its point of passage thereover, thereafter further stressing the liquid by accelerating its flow downwardly over the curved surface below and beyond the location of the aperture and supplying a gaseous dispersing medium to the aperture at a pressure above the ambient pressure of the surrounding atmosphere acting on the upper surface of the film whereby the film is further stressed to the point of rupture, the gas emerging from the aperture carrying minuscule, spherical particles of the liquid in the form of a mono-dispersed spray into the gaseous medium.

5. The method as defined in claim 1, including the steps of regulating the liquid flow and velocity over the surface and the air flow through said aperture.

6. The method defined in claim 4, wherein said further stressing of the film is caused by adhesion of the liquid to the surface as the film is drawn down along said curved surface.

7. The method of claim 1, wherein the gas is admitted to the aperture at approximately 5 to 20 p.s.i. above ambient gas pressure acting on the surface of the liquid film.

8. The method of dispersing a liquid in a natural fog-like array of minuscule particles comprising the steps of providing a convexly curved surface having a portion thereof disposed substantially in a horizontal plane, and the remaining portion curving downwardly, the surface being provided with an aperture therethrough; flooding the surface with the liquid to be dispersed, so that the liquid spreads in an unconfined film thereover creating an internal stress in the liquid, causing the liquid to flow down the downwardly curved portion of the surface to thereby increase internal stress therein by acceleration of the fluid due to gravitational force whereby the area of maximum stress in the filmed liquid occurs at the point of its passage over the aperture and introducing a gaseous medium through the aperture across the plane of the film whereby the internal stress is increased to the point where minuscule particles of liquid are broken away from the film and dispersed in the form of a spray having the characteristics of natural fog.

9. The method as defined in claim 8 wherein the gaseous medium into which the liquid is dispersed is the same as the medium passed through the aperture.

10. The method as defined in claim 8, wherein the gaseous medium is passed through the aperture at a pressure of from 2–20 p.s.i. above the ambient pressure of the medium into which the liquid is to be dispersed.

11. The method as defined in claim 8 wherein the minuscule particles are spherical in shape.

12. The method as defined in claim 11, wherein the spray is essentially mono-dispersed.

13. A method of dispersing liquids in a gaseous medium wherein the liquid is formed directly into spherical, mono-dispersed particles in spray form, comprising the steps of providing a liquid receiving surface having an aperture therethrough; introducing a flow of liquid onto the surface at a point spaced from the aperture; causing the liquid to continuously flow over the surface and said aperture; additionally imparting to the liquid, prior to its flow over the aperture, dispersing forces causing divergence of the liquid into the form of a prestressed film with an unconfined film surface area; maintaining said highly prestressed condition in the liquid prior to, during and after its flow over the aperture to a second point beyond the aperture; supplying a dispersing medium to said aperture to cause traverse of the prestressed liquid film by said dispersing medium in a direction toward said unconfined surface area, whereby a portion of said liquid film is dispersed in said medium in the desired droplet form.

14. The method defined in claim 13, wherein the step of imparting dispersing forces to the liquid is affected by permitting gravitational force to act on the liquid.

15. The method defined in claim 13, wherein the step of imparting dispersing forces on the liquid is affected by introducing the liquid on a wettable surface wherein the contact angle of the liquid is less than 154°.

References Cited

UNITED STATES PATENTS

| 386,025 | 7/1888 | Palmer | 239—338 |
|---|---|---|---|
| 742,986 | 11/1903 | Hopkins | 239—338 X |
| 1,019,630 | 3/1912 | Gilman | 239—426 X |
| 1,346,811 | 7/1920 | Diebold | 239—3 |
| 1,574,238 | 2/1926 | Elder et al. | 239—426 |
| 1,859,935 | 5/1932 | Potts et al. | 239—418 X |
| 1,978,566 | 10/1934 | Cole | 239—426 X |
| 2,193,828 | 3/1940 | Mason. | |
| 2,993,652 | 7/1961 | Curry | 239—338 |
| 3,097,645 | 7/1963 | Lester | 239—338 |

(Other references on following page)

FOREIGN PATENTS

| | | |
|---|---|---|
| 780,176 | 3/1968 | Canada. |
| 383,370 | 1/1908 | France. |
| 453,458 | 4/1913 | France. |
| 492,703 | 4/1954 | Italy. |

M. HENSON WOOD, Jr., *Primary Examiner.*

HOWARD NATTER, *Assistant Examiner.*

U.S. Cl. X.R.

239—337, 426, 434; 261—78, 115